United States Patent
Sun et al.

(10) Patent No.: US 8,523,162 B2
(45) Date of Patent: Sep. 3, 2013

(54) TOGGLE TYPE WITH ONE AXIAL POSITIONING MACHINE

(75) Inventors: Kuo-Ming Sun, Tao-Yuan (TW);
Zheng-Wei Mai, Tao-Yuan (TW);
Nai-Ming Chen, Tao-Yuan (TW);
Shih-Ming Wang, Tao-Yuan (TW)

(73) Assignee: Chung Yuan Christian University, Tao-Yuan (TW)

( * ) Notice: Subject to any disclaimer, the term of this patent is extended or adjusted under 35 U.S.C. 154(b) by 120 days.

(21) Appl. No.: 12/748,817

(22) Filed: Mar. 29, 2010

(65) Prior Publication Data
US 2011/0252904 A1 Oct. 20, 2011

(30) Foreign Application Priority Data
May 5, 2009 (TW) .............................. 098114888 A (51) Int. Cl.
*B23Q 3/18* (2006.01)
*B25B 5/12* (2006.01)
*B25B 1/14* (2006.01)

(52) U.S. Cl.
USPC .............. 269/228; 269/61; 269/309; 269/108

(58) Field of Classification Search
USPC ............... 269/55, 60, 71, 228, 291, 309, 310, 269/281.1
See application file for complete search history.

(56) References Cited

U.S. PATENT DOCUMENTS

| | | | | |
|---|---|---|---|---|
| 1,674,669 A * | 6/1928 | Stedman | ...... | 408/235 |
| 2,585,566 A * | 2/1952 | Lundstrom | ...... | 312/27 |
| 3,060,757 A * | 10/1962 | Plouck et al. | ...... | 74/101 |
| 4,609,422 A * | 9/1986 | Becking | ...... | 156/502 |
| RE32,804 E * | 12/1988 | Mason | ...... | 198/774.1 |
| 5,360,256 A * | 11/1994 | Miller et al. | ...... | 297/361.1 |
| 5,426,990 A * | 6/1995 | Francart, Jr. | ...... | 74/100.1 |
| 6,058,862 A * | 5/2000 | Umeda et al. | ...... | 112/443 |
| 6,206,422 B1* | 3/2001 | Goddard | ...... | 280/788 |
| 6,328,510 B1* | 12/2001 | Hanrath et al. | ...... | 409/235 |
| 6,637,818 B2* | 10/2003 | Williams | ...... | 297/330 |
| 6,761,518 B2* | 7/2004 | Stengele et al. | ...... | 409/235 |
| 7,707,907 B2* | 5/2010 | Bonev | ...... | 74/490.08 |
| 7,798,035 B2* | 9/2010 | Duval | ...... | 74/490.01 |
| 8,042,708 B2* | 10/2011 | Jeong et al. | ...... | 222/146.6 |
| 2007/0295138 A1* | 12/2007 | Wang et al. | ...... | 74/490.07 |
| 2012/0006140 A1* | 1/2012 | Wang et al. | ...... | 74/490.07 |

OTHER PUBLICATIONS

Taimina, Daina, Exploring Linkages, Mar. 12, 2006, KMODDL Library of Cornell, http://web.archive.org/web/20060312160845/http://kmoddl.library.cornell.edu/linkages/, p. 1-14.*

* cited by examiner

*Primary Examiner* — Joshua J Michener
*Assistant Examiner* — Elizabeth A Plummer
(74) *Attorney, Agent, or Firm* — WPAT, PC; Justin King (57) ABSTRACT

A toggle type with one axial positioning machine can increase positioning precision and decrease the impact from external impact by using the three-links design.

4 Claims, 6 Drawing Sheets

TOGGLE TYPE WITH ONE AXIAL POSITIONING MACHINE

FIELD OF THE INVENTION

The present invention relates to a positioning platform, and more particularly to a toggle-type with one axial positioning platform.

BACKGROUND OF THE INVENTION

Machines establish the groundwork of manufacturing industry, due to all products are produced by machines. Furthermore, machine tools establish the groundwork of mechanical industry due to all manufacturing processes require machine tool. Therefore, with the development in industry and the advancement in technology, the machine tool industry will be progressed as well. Because bio-medical industry, telecommunication industry and optoelectronic industry ramp recently, current related products have developed to be more miniaturized, for example, micro optical components of high-speed signal transmission, micro-sensors, micro holes of optical fibers and photolithography. Accordingly, the micro/meso-scale manufacturing technology is the key point in the oncoming fabrication technology.

In industrial applications, precise machining is based on high precision positioning technology. Therefore, how to enhance precise positioning is an important index in promotion of industry. The difficulties of the precise positioning technology resulted from too many uncertain factors. Generally, the factors, which are not concerned in large-scale positioning, should be concerned in micro/nano scale positioning.

The wet etching, plasma etching, LIGA process, electron beam, ion beams and so on are used in nano-scaled machining, thus resulting in the development of micro-electro mechanical system (MEMS). Generally speaking, MEMS technology is applied in the fabrication of about 2D to 2.5D geometry, and the relative precision of fabrication is limited to about 10-1 to 10-2 millimeter. However, for many 3-D miniaturized products having requirements of higher precision and complex shape, the MEMS technology is not able to meet the requirements. Besides, another bottleneck of the MEMS technology is that it can not be applied to metallic material or other diversified materials. Furthermore, scanning tunneling microscope (STM) or atomic force microscope need to be used in nano-scaled fabrication, but the operation speed is lower and the technique is not mature yet.

Currently, machine tools of multi-axles are serial connected mechanism. This serial connected mechanism, which is similar to cantilever beams, has a larger working area, but it may deform or have displacement due to external loading or its weight. Therefore, only the conventional servo system of serial connected mechanism of higher precision may achieve the precision of sub-micron or even nano-meter scaled. However, the requirements of the related control technique are very strict, and the cost of the whole equipment is effectively increased. Besides, machines features the piezoelectric actuators also have the problems of smaller stroke and hysteresis.

Figure 1:
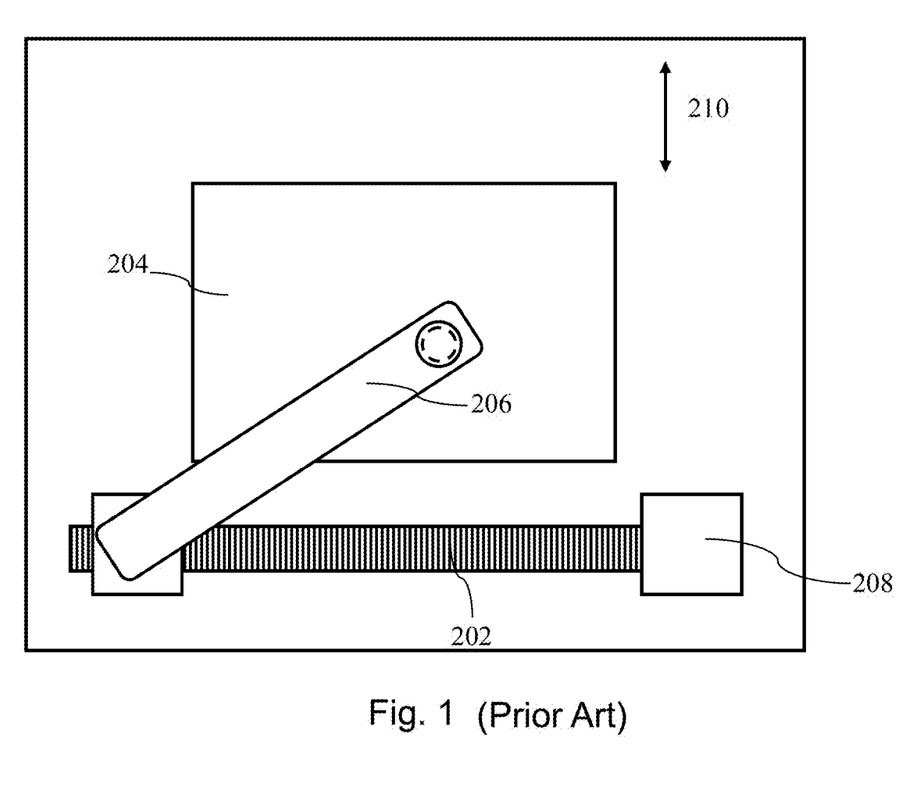
FIG. 1 is a schematic diagram of a prior art.

Generally, platforms of meso-scale machine tools, such as milling machines, are being directly placed on ballscrews and then driven by motors to move. Intrinsic or extrinsic vibration will affect machine tools operation and precision at the same time. Refer to FIG. 1, FIG. 1 shows a Taiwanese patent publication No. 302862, which discloses a toggle-type positioning platform, as a prior art. A screw rod 202 connects with a second platform 204 by a linkage 206, wherein the moving direction of the second platform 204 is perpendicular to the screw rod 202. When the screw rod driven by a motor 208 to rotate, the linkage 206 and the second platform 204 start to move along a predetermined path 210. To overcome the aforesaid disadvantages, the linkage 206 being disposed between the screw rod 202 and the second platform 204. Since the length L of the linkage 206 is fixed and the displacement of one end of the linkage 206 on the screw rod 202 is known, therefore the perpendicular distance H from the connecting portion to the screw rod 202 can be calculated from the trigonometric and geometric relationship. According to the numerical analysis data of the prior art, when the displacement of the screw is very small, the smaller distance H and higher positioning precision ΔH may be attained. Therefore, the length of the linkage, the displacement of the screw rod, the angle between the linkage and screw rod and other factors may affect the resolution and sensitivity of the platform. The method described above may provide higher precision of the machine tool, but the move speed of the platform is relatively low. Therefore, the present invention discloses tri-joints with one axial toggle-type machine to overcome the aforesaid disadvantages. Moreover, by the calculation of trigonometric functions, the precision of the platform can be less affected by extrinsic force and vibration and, at the same time, increase the move speed of the platform.

SUMMARY OF THE INVENTION

The present invention is directed to a toggle-type with one axial positioning machine with enhanced precision and faster moving speed, which extreme delicate, complex driving server is no longer required.

In one embodiment, the toggle-type with one axial positioning machine includes a first platform, a motor disposed on the platform, a ballscrew disposed on the first platform and coupled to the motor such that the motor drives the ballscrew rotation, a second platform disposed on the first platform with back and forth movement along a pre-determined direction, a linear bearing covering the ballscrew and moving along the ballscrew and with rotation of the ballscrew, a first link fastened to a lower part of the linear bearing and parallel to the ballscrew, a second link, and a third link between the second link and the second platform. The pre-determined direction is parallel to the ballscrew. The first link moves with the linear bearing. The second link, between the first link and the second link, is perpendicular to the third link. The ballscrew rotates to drive the first link, the second link, and the third link to move the second platform along the per-determined direction.

Each two of the first link, the second link, and the third link are connected by a bolt. The toggle-type with one axial positioning machine further comprises two rails disposed on outer sides of the second platform and between the first platform and the second platform.

The toggle-type with one axial positioning machine further comprises a fixed axis fastened on the second link. A position of the fixed axis can be any position of the second link. The fixed axis controls relative movement of the ballscrew and the second platform.

DESCRIPTION OF THE EXEMPLARY EMBODIMENTS

The present invention provides a toggle type with one axial positioning platform. For complete understanding of the present invention, the following description will describe in detail the method steps and the components. The present invention is not limited by the specified particulars of the radiation emitting semiconductor devices that are familiar to persons skilled in the art. In addition, well-known components or method steps are not described in detail so as to avoid any additional limitation. The preferable embodiments of the present invention are described in detail. In addition to the detailed descriptions, the present invention also can be applied to other embodiments. Therefore, the scope of the present invention is not limited, and is dependent on the following claims.

Figure 2:
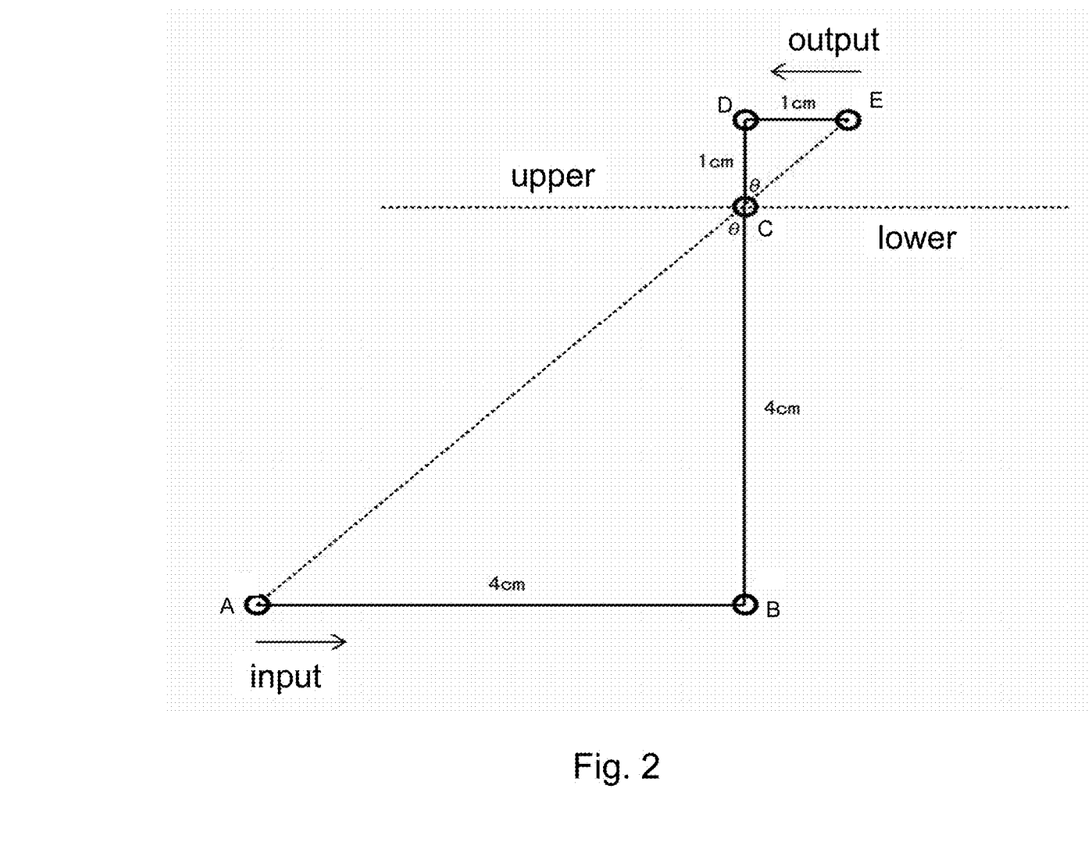
FIG. 2 is a schematic diagram for illustrating principle structure of tri-joints with one axial according to an embodiment of the present invention.

This invention is designed by using tri-joints with one axial principle, as shown in FIG. 2. In FIG. 2, an upper portion and a lower portion are demonstrated for better understanding. In FIG. 2, the tri-joints indicate AB, BC and DE. With a line from A to E, two proportional triangles with different directions are formed. An intersect C, formed by the line AE and line BD and a fixed point, separates the two proportional triangles. The aforesaid principle explains that ratio of input and output is determined by the two proportional triangles. Hence, to know one triangle can verify the relationship of input and output.

Figure 3:
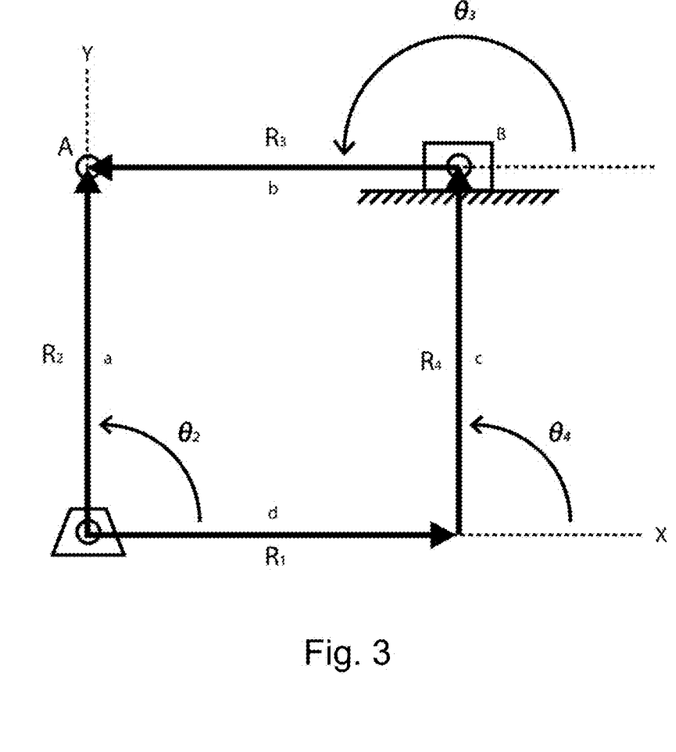
FIG. 3 is a schematic diagram for illustrating theoretical structure of tri-joints with one axial according to an embodiment of the present invention.

This invention, by using Euler's law, calculates movement of a rigid body with a fixed point; that's a rotation around an axis. In order to express this invention more clearly, please refer to FIG. 3. The trigonometric function expression can be:

$$R2-R3-R4-R1=0 \quad (1)$$

$$ae^{j\theta_2}-be^{j\theta_3}-ce^{j\theta_4}-de^{j\theta_1}=0 \quad (2)$$

with Euler's laws:

$$a(\cos\theta_2+j\sin\theta_2)-b(\cos\theta_3+j\sin\theta_3)-c(\cos\theta_4+j\sin\theta_4)-d(\cos\theta_1+j\sin\theta_1)=0 \quad (3)$$

x component:

$$a\cos\theta_2-b\cos\theta_3-c\cos\theta_4-d\cos\theta_1=0 \quad (4)$$

so, $$a\sin\theta_2-b\cos\theta_2-c\sin\theta_4-d=0 \quad (5)$$

y component:

$$a\sin\theta_2-b\sin\theta_3-c\sin\theta_4=0 \quad (6),$$

wherein d is an independent variable, a, b, c, and $\theta_4$ are known, and $\theta_2$ and $\theta_3$ can be solved. Because $R_2$ and $R_3$ are equal, $\Delta\theta$ of $\theta_2$ and $\theta_3$ are equal.

$$a\cos(90+\Delta\theta)-b\cos(180+\Delta\theta)=d \quad (7)$$

$$-a\sin\Delta\theta+b\cos\Delta\theta=d$$

$$a=b$$

$$(\cos\Delta\theta-\sin\Delta\theta)2=\left(\frac{d}{a}\right)2$$

$$\cos 2\Delta\theta-2\cos\Delta\theta\sin\Delta\theta+\sin^2\Delta\theta=\left(\frac{d}{a}\right)2$$

$$-2\cos\Delta\theta\sin\Delta\theta=\left(\frac{d}{a}\right)2-1$$

$$-\sin(2\Delta\theta)=\left(\frac{d}{a}\right)2-1$$

$$\Delta\theta=\frac{1}{2}\sin-1\left[\left(\frac{d}{a}\right)2-1\right]$$

With the above deduction, the upper and lower triangles are proportional, and input of d can give output value.

Back to FIG. 2, position of the fixed point C in line BD can determine sizes of the two proportional triangles, and proportional ratio of the upper and lower triangles are length DC to length BC. Therefore, distance DE can be obtained by using distance of line AB times ratio of length DC to length BC. In other words, output can be obtained by a precise input to increase precision of a platform.

One embodiment is disclosed according to above theory. Please refer to FIG. 4, a toggle-type positioning platform includes a first platform 102, a motor 104 disposed on the first platform 102, a ballscrew 110 disposed on the first platform 102 and coupled to the motor 104 such that the motor 104 can drive the ballscrew rotating, a second platform disposed on the first platform 102 and moved back and forth along a pre-determined direction 126, wherein the pre-determined direction 126 is anti-parallel to direction of the movement of the ballscrew, and a linear bearing covering the ballscrew 110 and moving with rotation of the ballscrew 110. The toggle-type positioning platform also includes a first link 114 fastened to upper portion of the linear bearing 108 and parallel to the ballscrew 110 and moved with the linear bearing 108, a second link 116, and a third link 118. the second link 116, between the first link 116 and the third link 118, is perpendicular to both first link 114 and third link 118. The third link 118 is between the second link 116 and the second platform 120, wherein rotation of the ballscrew 110 can drive the first link 114, the second link 116, and the third link 118 moving to move the second platform along the pre-determined direction 126. In order to rotate the ballscrew 110 stable, an L-support 112 is provided for supporting the ballscrew 110.

Next, the second platform 120 can move along the pre-determined direction 126 by using two rails 122. Length of the rails 122 can be about length of the pre-determined direction 126. Direction of the rails 122 can be parallel to the ballscrew 110. The rails 122 can be between the first platform 102 and the second platform 120, and can disposed on two opposite sides of the second platform 120. The first platform can have a trench (not shown in the FIG. 4) and the second platform 120 can move along the trench, wherein the trench can be V shape, U shape, or other shapes.

Figure 4:
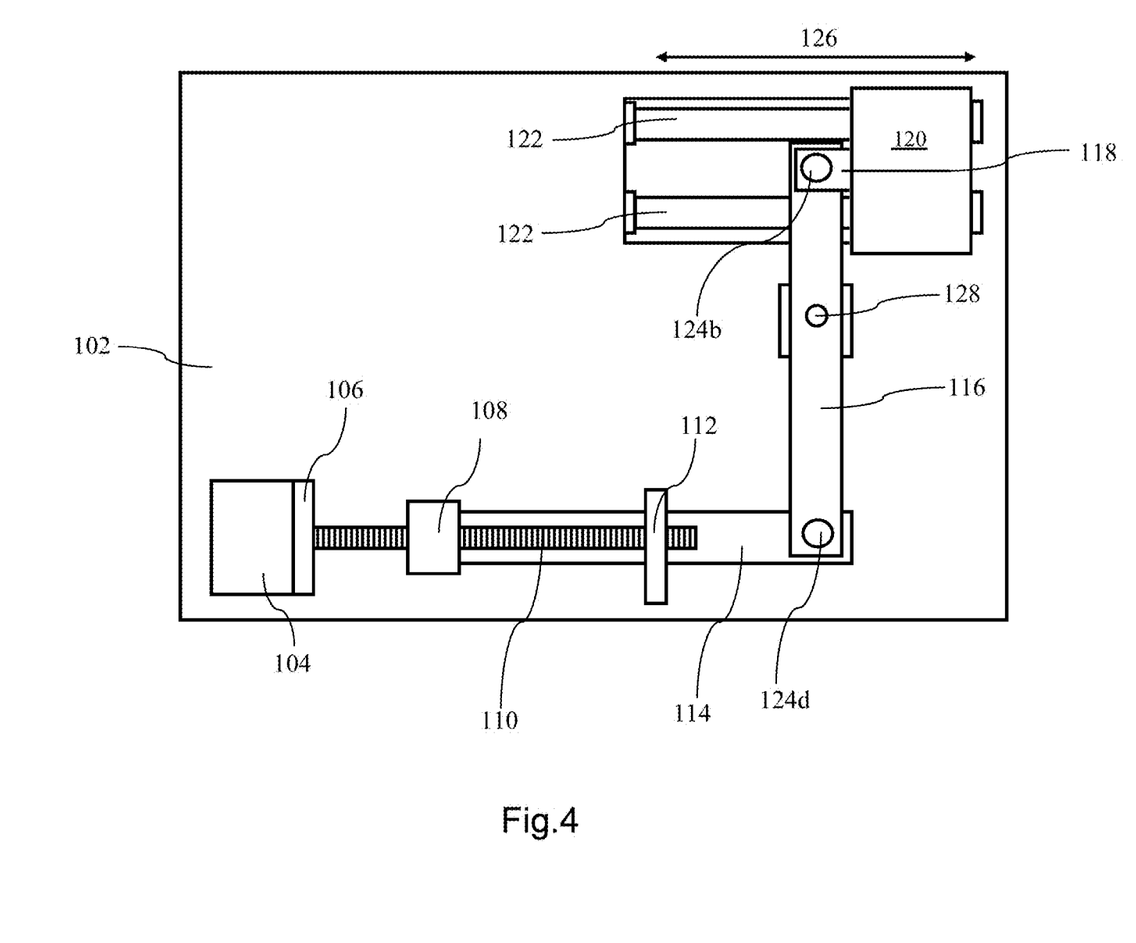
FIG. 4 is a schematic diagram for illustrating sketch structure of toggle-type with one axial positioning machine according to an embodiment of the present invention.

Then, the opposite ends of the first link 114 connect to the linear bearing 108 and the second link 116 respectively. The first link 114 and the second link 116 form a right angle. The opposite ends of the second link 116 connect to the first link 114 and the third link 118 respectively. The first link 114 is parallel to the third link 118, and the second link 116 is perpendicular to both the first link 114 and the third link 118.

Further, a fixed axis 128 is disposed on the second link 116. The fixed axis 128 can make the opposite two ends of the second link 116 free rotation without movement and therefore can change angles to the first link 114 and the third link 118. The two opposite ends of the third link 118 connect to the second link 116 and the second platform 120. The connections among three links are buckled by a first bolt 124b, a second bolt 124d and C-hooks, and hence the angles between any two links and be varied. While the ballscrew 110 is rotated by the motor 104, the liner bearing 108 covering on the ballscrew 110 can move back or forth with rotation of the ballscrew 110. because the first link 114 is fastened to the lower portion of the liner bearing 108, and while the linear bearing 108 moves with the ballscrew 110, angles between each of the three links can be varied. The second platform 120 is then moved along the pre-determined direction 126 by the movement of the three links.

Then, a LASER meter is used to measure movement of the second platform 120. Placing a beam splitter in front of the LASER meter and a reflecting mirror on the second platform and then aligned for reflecting LASER beam. A measuring method is as follows. The beam splitter is used for splitting the LASER beam into a reference beam and a beam to be measured when it enters. The beam to be measured is then reflected back on the same path by the reflecting mirror and meets the reference beam. After analyzed by a computer, the displacement of the second platform can be known.

Table 1 is numerical analysis data of the toggle-type with one axial positioning platform according to one embodiment of the present invention, wherein the data is calculated by the measuring method described in the above paragraph.

TABLE 1

| Loops | Detect value | Distance |
| --- | --- | --- |
| 1 | 0.033 | 0.0073 |
| 2 | 0.0403 | 0.0016 |
| 3 | 0.0419 | 0.0018 |
| 4 | 0.0437 | 0.0112 |
| 5 | 0.0549 | 0.0907 |
| 6 | 0.1456 | 0.0962 |
| 7 | 0.2418 | 0.0953 |
| 8 | 0.3371 | 0.0879 |
| 9 | 0.425 | 0.1024 |
| 10 | 0.5274 | 0.101 |
| 11 | 0.6284 | 0.0963 |
| 12 | 0.7247 | 0.0978 |
| 13 | 0.8225 | 0.1005 |
| 14 | 0.923 | 0.0978 |
| 15 | 1.0208 | 0.0975 |
| 16 | 1.1183 | 0.1 |
| 17 | 1.2183 | 0.0931 |
| 18 | 1.3114 | 0.0949 |
| 19 | 1.4063 | 0.094 |
| 20 | 1.5003 | 0.0972 |
| 21 | 1.5975 | 0.0953 |
| 22 | 1.6928 | 0.1057 |
| 23 | 1.7985 | 0.1001 |
| 24 | 1.8986 | 0.0991 |
| 25 | 1.9977 | 0.0996 |
| 26 | 2.0973 | 0.098 |
| 27 | 2.1953 | 0.0933 |
| 28 | 2.2886 | 0.1082 |
| 29 | 2.3968 | 0.1007 |
| 30 | 2.4975 | 0.0964 |
| 31 | 2.5939 | 0.1001 |
| 32 | 2.694 | 0.1018 |
| 33 | 2.7958 | 0.0992 |
| 34 | 2.895 | 0.0974 |
| 35 | 2.9924 | 0.1026 |
| 36 | 3.095 | 0.0995 |
| 37 | 3.1945 | 0.101 |
| 38 | 3.2955 | 0.1 |
| 39 | 3.3955 | 0.1003 |
| 40 | 3.4958 | 0.0977 |
| 41 | 3.5935 | 0.0935 |
| 42 | 3.687 | 0.1028 |
| 43 | 3.7898 | 0.0997 |
| 44 | 3.8895 | 0.1003 |
| 45 | 3.9898 | 0.1042 |
| 46 | 4.094 | 0.0997 |
| 47 | 4.1937 | 0.099 |
| 48 | 4.2927 | 0.0937 |
| 49 | 4.3864 | 0.1053 |
| 50 | 4.4917 | 0.0992 |
| 51 | 4.5909 | 0.0972 |
| 52 | 4.6881 | 0.1028 |
| 53 | 4.7909 | 0.1024 |
| 54 | 4.8933 | 0.0981 |
| 55 | 4.9914 | 0.1024 |
| 56 | 5.0938 | 0.092 |
| 57 | 5.1858 | 0.0973 |
| 58 | 5.2831 | 0.1101 |
| 59 | 5.3932 | 0.0955 |
| 60 | 5.4887 | 0.1025 |
| 61 | 5.5912 | 0.1006 |
| 62 | 5.6918 | 0.1045 |
| 63 | 5.7963 | 0.1003 |
| 64 | 5.8966 | 0.0996 |
| 65 | 5.9962 | 0.1006 |
| 66 | 6.0968 | 0.0984 |
| 67 | 6.1952 | 0.1019 |
| 68 | 6.2971 | 0.0998 |
| 69 | 6.3969 | 0.0998 |

Figure 5:
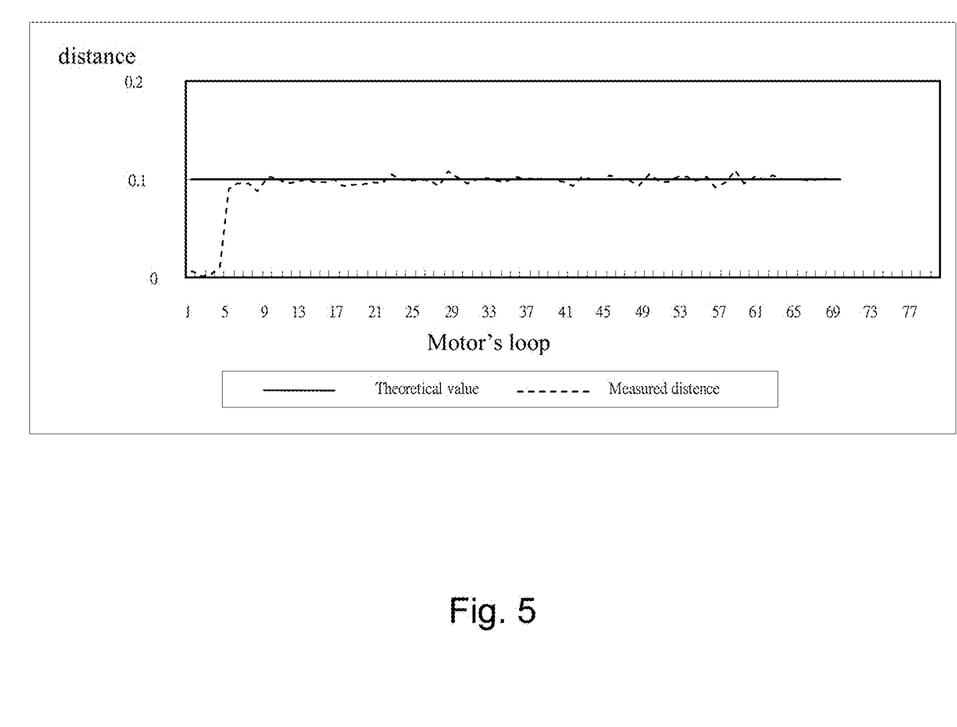
FIG. 5 is a diagram for illustrating a comparison between theoretical value and measured values of moving distance versus motor rotating loops of the toggle-type with one axial positioning machine.
Figure 6:
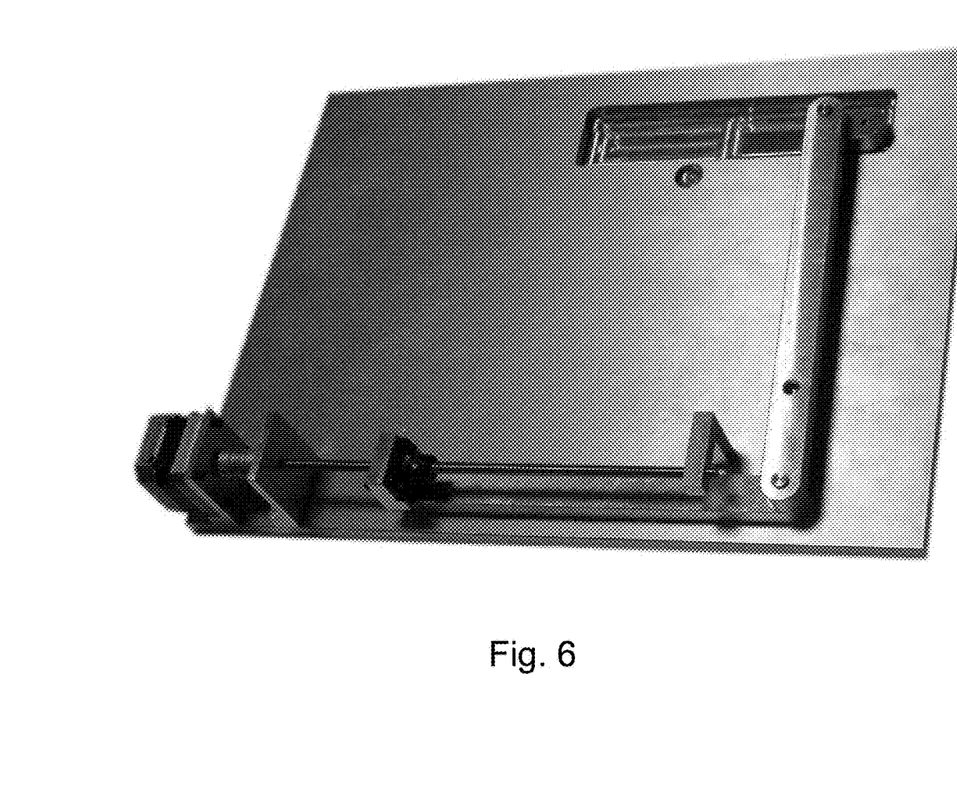
FIG. 6 is a sample photograph of the toggle-type with one axial positioning machine according to this invention.

From the table 1, a relationship between measured values of moving distance versus motor rotating loops of the toggle-type with one axial positioning machine is shown in FIG. 5. In this embodiment, number of motor's rotation loops is only to 69, but all data in the Table 1 can derive moved distance of the second platform in this invention. It is obvious that differences, between theoretical value to measured value from the first loop to the fourth loop in FIG. 5 and refer to the Table 1, have a great value. It may be incurred by tolerances of the motor or ballscrew. When the motor rotates about more than five loops, each measured moved distance is about 0.1 mm for each loop. The theoretical value of each moved distance is 0.1 mm for each loop, and averaged measured value is about 0.09972, with an error 0.00028 mm. Hence, this invention can reach movement accuracy to five digits under rotation. By using this movement average value times total loops and multiplied by position of the fixed point C on the second link, moved distance of the second platform can be calculated. All experience data depend on material selected, but will not be discussed in this invention. A sample is shown in FIG. 6 for reference.

This invention discloses a toggle-type with one axial positioning machine with enhanced precision. Further, moving speed in this invention can be faster than single-link toggle type mechanism. Moreover, high precision and high resolution can be provided without using extreme delicate, complex driving server.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A toggle with one axial positioning machine, comprising:
   a first platform;
   a motor disposed on said first platform;
   a ballscrew disposed on said first platform and coupled to said motor, such that said motor drives said ballscrew rotation;
   a second platform, disposed on said first platform, is constrained to back and forth movement along a pre-determined direction, wherein said pre-determined direction is parallel to said ballscrew;
   a linear bearing covering said ballscrew and moving along said ballscrew and with rotation of said ballscrew;
   a first link fastened to a lower part of said linear bearing and parallel to said ballscrew, said first link moving with said linear bearing;
   a second link;
   a third link between said second link and said second platform, said second link between said first link and said third link, said second link being perpendicular to said third link, wherein said ballscrew rotates to drive said first link, said second link, and said third link to move said second platform along said pre-determined direction with accuracy to five digits under rotation;
   a fixed axis located on said second link;
   a first bolt connecting said first link and said second link, wherein imaginary lines connecting said first bolt, said linear bearing and said fixed axis form a lower triangle; and
   a second bolt connecting said second link and said third link, wherein imaginary lines connecting said second bolt, said second platform and said fixed axis form an upper triangle smaller than said lower triangle.

2. The toggle with one axial positioning machine according to claim 1, wherein a position of said fixed axis can be any position of said second link.

3. The toggle with one axial positioning machine according to claim 2, wherein said fixed axis controls relative movement of said ballscrew and said second platform.

4. The toggle with one axial positioning machine according to claim 1, further comprising two rails disposed on outer sides of said second platform and between said first platform and said second platform.

* * * * *